June 20, 1967        J. V. MILLER        3,327,192

TWO-SPEED MOTOR CONTROL

Filed Nov. 19, 1963        3 Sheets-Sheet 1

INVENTOR.
J. VANCE MILLER
BY McLaughlin & Cahill
ATTORNEYS

June 20, 1967  J. V. MILLER  3,327,192
TWO-SPEED MOTOR CONTROL
Filed Nov. 19, 1963  3 Sheets-Sheet 2

INVENTOR.
J. VANCE MILLER
BY
ATTORNEYS

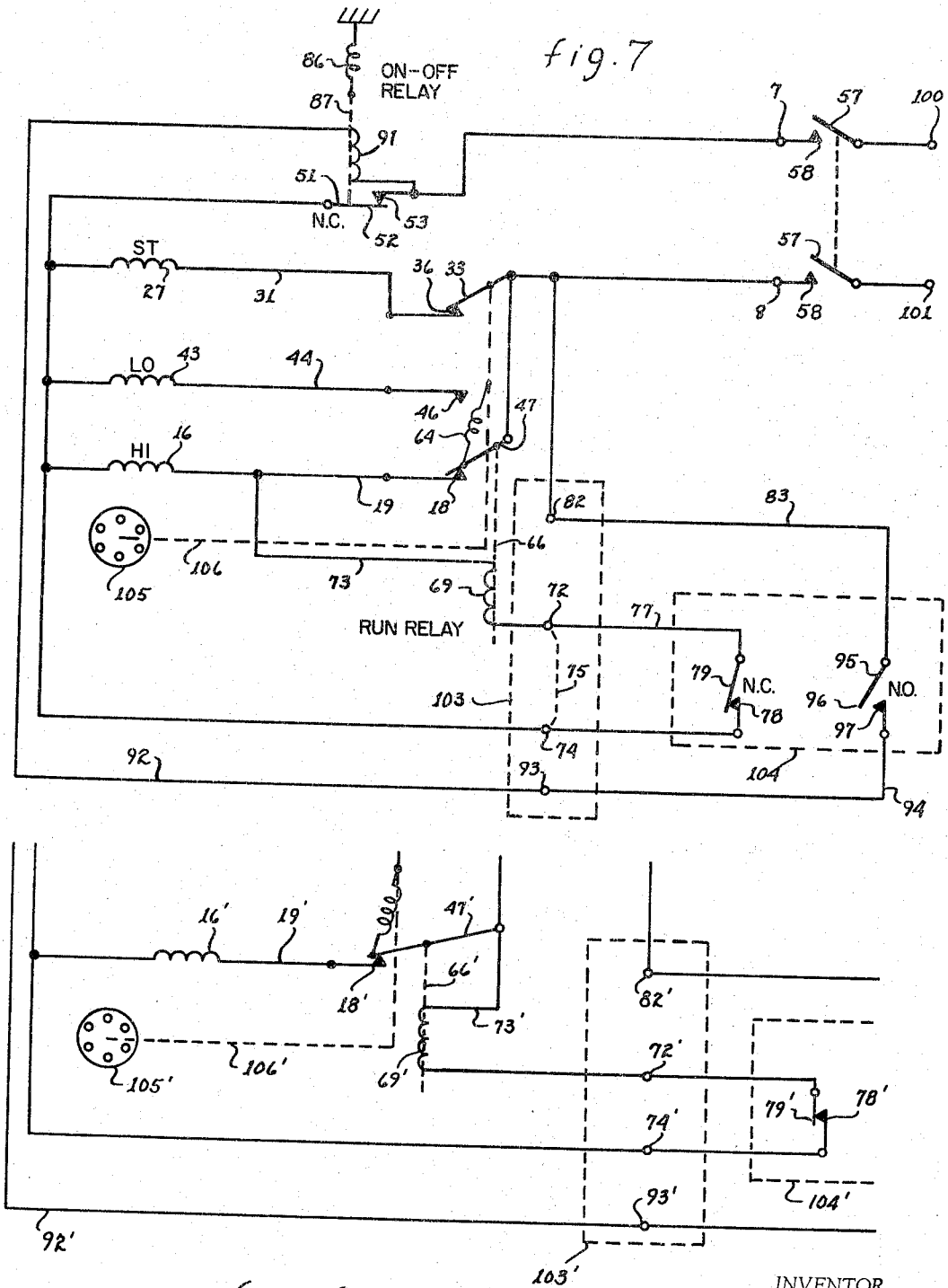

United States Patent Office 3,327,192
Patented June 20, 1967

3,327,192
TWO-SPEED MOTOR CONTROL
J. Vance Miller, 2226 E. Amelia, Phoenix, Ariz. 85016
Filed Nov. 19, 1963, Ser. No. 324,685
3 Claims. (Cl. 318—221)

The present invention pertains to motor controls, and more specifically, to a two-speed control for operation on a single-phase circuit.

Two-speed fractional horsepower motors of the split-phase induction type commonly have a starting winding and two running windings. The starting winding is placed in the circuit when the motor rotor is at rest and is subsequently removed from the circuit by the action of a centrifugal switching mechanism that opens the circuit to the starting winding when the motor attains a desired rotational velocity. Which of the two running windings is to be selected is usually determined by a separate switch, remote from the motor, which may be placed in the circuit to connect either of the windings at any given time. The two windings, one high speed and one low speed, generally have different numbers of poles to thereby determine the running speed of the motor rotor. The user must then close a starting switch and operate a second switch to select the speed of the motor. The starting switch and the speed selection switch require a minimum of three wires extending from the motor to the switch locations which may be remote from the motor and may be placed a substantial distance therefrom. This two-speed motor system does not readily lend itself to automatic remote control, such as, for example, the control of motor speed by the operation of a thermostat located remotely from both the manual operated switches and the motor.

Accordingly, it is an object of the present invention to provide a single-phase two-speed fractional horsepower motor control utilizing only two wires from a remotely manually operated on-off switch to control both the speed and the on-off condition of the motor.

It is another object of the present invention to provide a single-phase two-speed fractional horsepower motor control that may readily be converted to the utilization of automatic remote equipment for controlling both the on-off condition and the speed of the motor.

It is still another object of the present invention to provide a single-phase two-speed fractional horsepower motor control that may be utilized with a single pair of single-phase wires to control the speed thereof while utilizing automatic remote control for controlling the on-off condition of the motor.

Further objects and advantages of the present invention will become apparent to those skilled in the art as the description thereof proceeds.

Briefly, in accordance with one embodiment of the present invention, the motor housing has mounted therein spring-loaded relays adapted to selectively urge contacts to close and thereby energize a predetermined winding of the conventional two running windings of a two-speed fractional horsepower motor. The centrifugal mechanism, while urging certain contacts to close as indicated above, is inhibited from closing certain other contacts through the action of a run relay which holds the contacts in a position determined when the motor was stopped. The speed of the motor, or the winding being energized may be changed, by interruption of the single-phase circuit by the manual switch included therein to thus temporarily de-energize the run relay and permit the spring biasing to change the completed circuit from one of the running windings to the other of the running windings. The speed change may be effected through the utilization of a remote contact device such as a thermostat placed in series with the run relay. A second relay may be provided to interrupt the power circuit to all windings of the motor to thus cause the motor to stop. The operation of the two relays in combination provide a means whereby the motor operation, both on-off conditions and speed, may be controlled remotely while nevertheless permitting control manually through the utilization of a single pair of single-phase wires.

The present invention may more readily be described in connection with the accompanying drawings in which:

FIG. 7 is a schematic illustration of the circuit of the present invention;

FIG. 8 is a modification of the circuit of FIG. 7.

Figure 1:
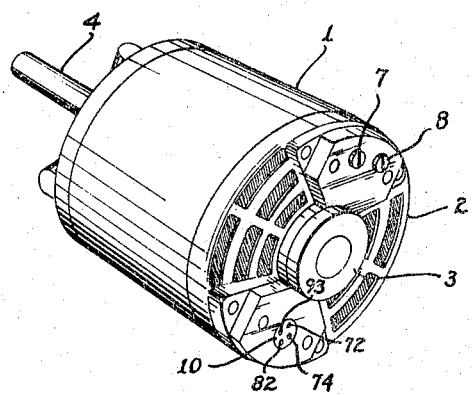
FIG. 1 is a perspective view of a motor housing showing the control outlet and connecting terminals of a motor control constructed in accordance with the teachings of the present invention.

Referring now to FIG. 1, an isometric view is shown of a typical single-phase two-speed fractional horsepower motor having a frame 1 of general cylindrical shape and an end bell 2 containing a bearing housing 3. The bearing housing supports bearings which, in turn, support a rotor shaft 4 which extends coaxially of the cylindrical shell from one end thereof. Terminals 7 and 8 are provided for the connection of the two wires of a single-phase source of alternating current. It may be noted here that although the motor of FIG. 1 is a two-speed motor, that only two power connections, at terminals 7 and 8, are required to operate the motor as a two-speed motor. In the event that remote automatic controls are utilized to control the motor of FIG. 1, a four-wire female outlet 10 is shown for connection of appropriate control wires. If the motor of FIG. 1 is to be operated solely by manual switch means, a simple male plug may be inserted in the female plug 10 having appropriate jumper wires therein to convert the motor of FIG. 1 to simple manual control.

Figure 2:
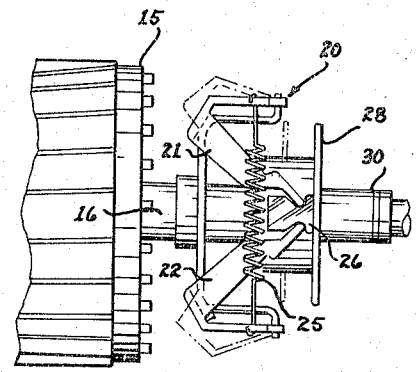
FIG. 2 is an illustration of a centrifugal mechanism utilized in the control of the present invention.

Referring now to FIG. 2, a portion of the rotor and rotor shaft of the motor of FIG. 1 are shown. The rotor 15 constitutes a conventional squirrel cage rotor having conducting bars ending in a conductive disc secured to the end of the cylindrical rotor. The rotor shaft 16 extending axially from one end thereof includes a centrifugal mechanism shown generally by the arrow 20. The centrifugal mechanism includes centrifugal throw-out arms 21 and 22 which are urged inwardly by a biasing spring 25. The inner ends of the throw-out arms abut a detented bar 26 which is secured to a disc shaped member 28. When the rotor and rotor shaft rotate the throw-out arms are urged to the extended position indicated in dotted lines in FIG. 2, thus extending the biasing spring and forcing the inner ends of the throw-out arms toward the motor stator thereby moving the disc shaped member 28 to a position shown in dotted lines. The end 30 of the rotor shaft is mounted in the bearings 3 of the end bell 2 of the stator housing.

Figure 3:
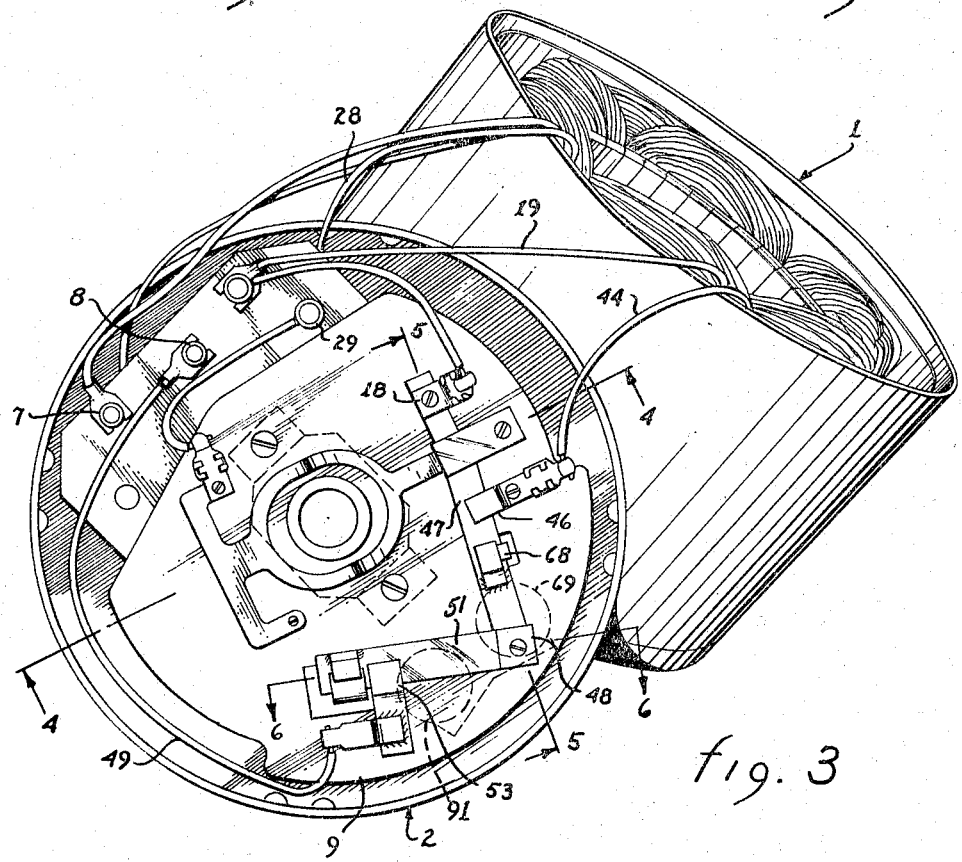
FIG. 3 is a view of the motor of FIG. 1 with the end bell removed showing the conductors and switches of the present invention.

Referring now to FIG. 3, a view of the motor of FIG. 1 is shown with the end bell removed thus exposing the switching mechanism that is operable through the utilization of the centrifugal mechanism of FIG. 2 in conjunction with a pair of relays that will be described later.

Terminals 7 and 8 provide connection to any source of ordinary 60 cycle single-phase alternating current. These terminals provide power to the selected run winding and the start winding, shown partly exposed in FIG. 3. Terminal 7 may conveniently be called the common terminal and terminal 8 may conveniently be called the power terminal. The power terminal 8 is connected through a conductor 49 to a contact arrangement the top view of which is shown at 53. The contact 53 is connected through flexible blade member 51 to a terminal post 48. Also connected to the terminal post 48, and in conductive relation therewith, is a second flexible conductor blade 47. The flexible conductor blade 47 may make electrical contact at 46 thus completing a circuit through conductor 44 to the low speed winding of the motor, or may make contact to the contact 18 and thus provide a completed electrical circuit for the high speed winding through conductor 19.

Figure 4:
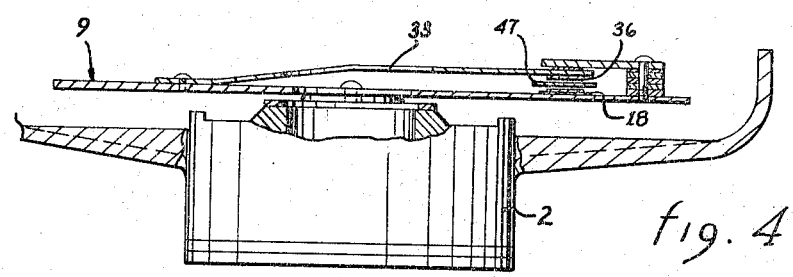
FIG. 4 is a sectional view of FIG. 3 taken along line 4—4.

The cooperative relationship between the centrifugal mechanism of FIG. 2 and the switching arrangements and relays shown in FIGS. 3 through 6 may more easily be described by reference to FIGS. 4, 5, and 6, individually. Referring first to FIG. 4, the end bell 2 is shown having a mounting board 9 secured thereto which supports the switching mechanisms as will be described later. The end bell 2 fits over one end of the cylindrical stator housing 1 containing the centrifugal mechanism. The disc 28, which is urged inwardly of the stator through the action of the centrifugal throw-out arms, abuts the flexible conductor 33 when the rotor is at rest. When conductor 33 is abutted by the disc the conductor is forced downwardly (in FIG. 4) to cause contacts 18 and 36 to contact flexible conductor blade 47. As the rotor attains a predetermined rotational velocity, the throw-out arms of the centrifugal mechanism force the disc inwardly toward the stator thus disengaging the flexible conductor 33 and permitting the conductor to assume the position shown in FIG. 5 wherein contacts 18 and 36 are separated and do not contact the flexible conductor blade 47. Thus, the centrifugal mechanism operates through the flexible conductor 33 to make and break contacts that establish electrical circuits as will be described later.

Figure 5:
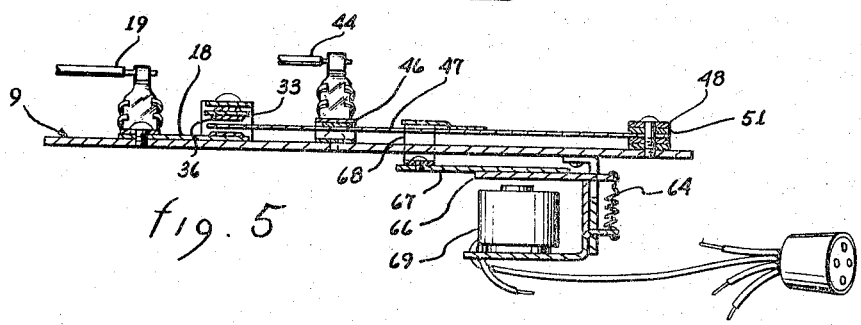
FIG. 5 is a sectional view of FIG. 3 taken along line 5—5.

With reference to FIG. 5 it may be seen that the operation of the centrifugal mechanism also provides for the make and break of the contact between the flexible conductor blade 47 and a contact 46. The contact 46 is connected through lead 44 to the low speed winding of the motor. When the blade 33 is in the position shown in FIGS. 4 and 5 the flexible conductor blade 47 is in contact with contact 46 thus completing an electrical circuit to the low speed motor winding; however, when the flexible blade 33 is forced downwardly by the action of the centrifugal mechanism on the motor, the contact between contact 46 and the flexible conductor blade 47 is broken and a new contact is made between the blade 47 and contact 18 to thereby complete an electrical circuit through conductor 19 to the high speed motor winding. The selective positioning of the flexible conductor blade 47, wherein it may be in contact with contact 46 or contact 18, may also be chosen by the actuation of a run relay 69 which is coupled through an armature 66 and armature extensions 67 and 68 to the flexible conductor blade 47. The relay is biased to the position shown in FIG. 5 through the action of a biasing spring 64. When the run relay 69 is energized, the flexible conductor blade 47 is forced downwardly as shown in FIG. 5 to make the connection with contact 18. Thus, when the run relay is energized an electrical circuit will be established between the flexible conductor blade 47 and contact 18 regardless of the condition of the centrifugal mechanism of the motor. The fixed end of the flexible conductor blade 47 is attached to a mounting post 48 where it is in intimate electrical contact with another flexible blade conductor 51.

Figure 6:
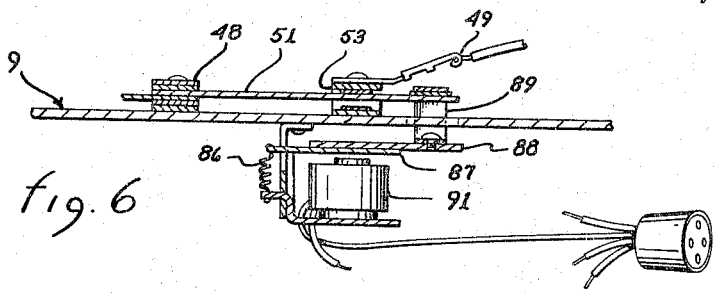
FIG. 6 is a sectional view of FIG. 3 taken along line 6—6.

Referring to FIG. 6, it may be seen that a flexible conductor 51, secured at one end to the mounting post 48 is in normal contact with contact 53 thus completing an electrical circuit through the conductor 49 to the power terminal of the motor. An on-off relay 91 is mounted on the mounting panel 9 and is connected through its armature 87, armature extension 88 and 89 to the flexible conductor 51. The relay is maintained in the position shown in FIG. 6 through the utilization of a biasing spring 86. When the on-off relay is energized, the armature 87 and its extensions 88 and 89 are attracted to the core of the relay thus opening the contact between flexible blade 51 and the contact 53. Thus, the electrical connection between the flexible conductor blade 47 through the flexible blade 51 will be broken when the on-off relay 91 is energized thereby removing the power terminal from the circuitry of the motor and disabling the motor.

The description of the invention may be facilitated by reference to FIG. 7 which shows a schematic circuit diagram of a single-phase two-speed fractional horsepower motor and control system of the present invention. Insofar as it is possible to represent the specific structure shown in FIGS. 1 through 6 in the schematic drawing of FIG. 7, the schematic representation of the physical parts will bear the same reference numerals as these parts bear in the remainder of the figures. A pair of single-phase alternating current terminals 100 and 101 are shown which are supplied by a source of alternating current (not shown). Power provided to the terminals 100 and 101 is delivered to the input terminals 7 and 8 of the motor through a manual switch shown in FIG. 7 as two ganged single-pole single-throw switches each having a switch blade 57 and contact points 58. Power is thus provided from a source to the input terminals 7 and 8 of a motor through the manual switch. As stated previously, the terminal 7 has been considered as the motor common terminal and terminal 8 has been considered as the motor power terminal. This terminology is utilized generally in the industry and has as its primary purpose the standardization of wire codes in the industry to facilitate circuit connection and repair. The motor is shown generally having a squirrel cage rotor 105 and three windings: a start winding 27, a low speed running winding 43, and a high speed running winding 16. Each of the windings is connected to the common terminal 7 through an on-off relay having contacts 52 and 53 and a movable contact blade 51. The opposite sides of each of the windings are connected to the power terminal 8 in accordance with a selected rotational velocity as will be described later. The on-off relay includes relay coil 91 and armature 87 connected to the contact blade 51. The on-off relay is biased to the normally closed position by a bias spring 86. The relay coil 91 is connected at one side thereof to the common terminal 7, and is connected at the other side through conductor 92 to a control terminal 93. The control terminal 93 is connected through conductor 94 to a remote, automatically controlled, switch device such as a thermally operated switch. The switch comprises normally open contacts 96 and 97 and movable contact blade 95. The opposite side of the switch is connected through conductor 83 to control terminal 82 which, in turn, is directly connected to power terminal 8. Thus, the on-off relay coil 91 will be energized only when contacts 96 and 97 are closed at which time the energization of the relay coil 91 will urge the armature 87 against the biasing spring 86 to thereby open contacts 52 and 53 and break the circuit from the common terminal 7 to the motor windings. The on-off relay is shown in the common leg in FIG. 7 and in the power leg in FIGS. 1–6. The relay may be placed in either leg without altering performance of the present invention.

The starting winding 27 is connected through conductor 31, contact 36, movable switch blade 33 to power terminal 8. The switch blade 33 is mechanically coupled, as indicated in FIG. 7 by the dashed line 106, to the centrifugal mechanism rotating with the rotor 105, such as the centrifugal mechanism shown and described in connection with FIG. 2. Thus, with the contact 36 in the position shown in FIG. 7, power will be supplied from common terminal 7 through the starting winding to power terminal 8 until the centrifugal mechanism causes switch blade 33 to break the contact 36 thus de-energizing the starting winding 27.

The low speed running winding 43 is connected through conductor 44 to a contact 46; similarly, the high speed running winding 16 is connected through conductor 19 to a contact 18. The selection of the low or high speed running windings depends on the position of the flexible conductor blade 47 connected to the power terminal 8. The flexible conductor blade 47 is shown in FIG. 7 at the rotor rest position wherein the motor will be started with the high speed running winding connected in the circuit. Since the starting winding and the high speed running winding are the two windings that are required to efficiently start the single-phase two-speed fractional horsepower motor, the flexible conductor blade 47 will always be biased to the position shown in FIG. 7 when the rotor is at rest. It may be noted that the flexible conductor blade 47 is connected to the centrifugal mechanism, as illustrated by the dashed line 106, only through a spring biasing means 64. Thus, when the rotor 105 obtains the appropriate rotational velocity the centrifugal mechanism will cause switch blade 33 to rotate upward as shown in FIG. 7 and will also attempt to pivot flexible conductor blade 47; however, the flexible conductor blade 47 is free to remain in the position shown in FIG. 7 if sufficient force is applied to the blade to hold it in that position against the force of spring biasing means 64. To control the positioning of blade 47, a relay armature 66 is secured thereto and is actuated by a run relay coil 69. The run relay coil 69 is connected to one side of the high speed running winding through conductor 73. The other side of the run relay coil 69 is connected to a control terminal 72. Control terminal 72 is connected through a conductor 77 to a normally closed switch comprising switch blade 79 and contact 78. The opposite side of the normally closed remote control switch, which may be of the thermostat type, is connected to control terminal 74. Control terminal 74 is connected to the common side of the motor windings. Thus, when the flexible conductor blade 47 is shown in the position of FIG. 7 and the circuit is energized, a circuit will be completed through the flexible conductor blade 47, contact 18, conductor 19, conductor 73, and run relay coil 69 through the contact 78 to the common side of the motor windings. Energization of the run relay coil 69 will thus urge the flexible conductor blade 47 downwardly. When the rotor obtains appropriate velocity and the centrifugal mechanism attempts to force the contact blade upward, the force exerted by the run relay coil on the armature 66 will be sufficient to overcome the force exerted by the spring biasing means 64 and thus maintain the flexible conductor blade 47 in the position shown in FIG. 7. Thus, the motor will subsequently operate with the high speed running winding connected into the power circuit to cause the rotor to rotate at the designated higher speed. If the power circuit is temporarily interrupted, the run relay coil 69 is de-energized and the spring biasing means 64 swings the flexible conductor blade 47 into contact with the contact 46. Thus, the subsequent re-energization of the circuit will energize the low speed running winding 43 and will not re-connect the run relay coil 69 into the circuit. Thus, the motor speed may be changed from high speed to low speed merely by the temporary interruption of the circuit supplying current to the motor. If the manual interruption of the power circuit is to be the only controlling means utilized with the motor, an electrical jumper 75 may be provided across terminals 72 and 74 and the automatic circuit interrupting switch 78–79 may be eliminated. As indicated in FIG. 7, the control terminals 72, 74, 82, and 93 are all contained on a convenient panel 103 which, as shown in FIGS. 1, 5, and 6 take the form of a simple female connector that is mounted flush with the end bell of the motor so that external controls may readily be secured thereto. The external controls are shown in FIG. 7 as a unitary structure 104 containing two single-pole single-throw switches each of which may conveniently be thermally sensitive. In a principal application for which the present invention may be utilized, the motor may power the blower of a cooling unit of the type commonly found in the southwestern part of the United States. In such an application the normally closed contact 79 may be a bimetal device which, when the temperature drops sufficiently, will open the contacts thus causing the blower motor to assume a relatively lower rotational velocity. Similarly, the switch 95 may be a bi-metal device which, if the temperature should drop sufficiently to warrant shutting the motor off, will close contacts 96 and 97 and interrupt the power circuit to the motor to cause it to completely shut off. If the temperature subsequently warms, the reopening of contacts 96 and 97 will cause the motor to restart at the higher speed which may be shifted to the lower speed in accordance with the position of the normally closed switch 79.

The operation of the device of the present invention may now be given by reference to all of the figures taken together. Assume that the motor is at rest and that the switch 57 is closed to connect a suitable source of single phase alternating current to the common and power terminals 7 and 8 respectively of the motor. At rest the switch arm 33 was in contact with contact 36 to thereby connect the starting winding 27 into the motor circuit; similarly, the flexible conductor blade 47 was in contact with contact 18 to connect the high speed running winding 16 into the motor circuit. The motor rotor will gain rotational velocity until the predetermined velocity is reached necessary for the actuation of the centrifugal mechanism to cause the disc 28 to disengage flexible conductor 33. When the flexible conductor 33 retracts upwardly to the position shown in FIG. 4 the contact will be broken between the conductor 33 and the contact 36 thus removing the starting winding from the motor circuit; simultaneously, flexible conductor blade 47 will be urged away from contact 18. When the high speed running winding 16 is energized, the potential developed thereacross is impressed across the run relay coil 69 through the expediency of conductor 73, terminal 72, conductor 77, switch 79, and terminal 74. Thus, when the flexible conductor blade 47 is urged to break contact with contact 18 the force exerted on the switch arm by the run relay armature 66 will maintain the contact and prevent the high speed running winding from being disengaged and removed from the circuit. At this point of the operation, the motor rotor is rotating at the high speed determined by the high speed running winding. The low speed running winding and the starting winding are not in the running circuit.

The normally closed switch 79 and normally open switch 95 remain in their normal positions and normally closed switch 51 remains closed since the on-off relay remains deenergized and the biasing spring 86 maintains contact 52 and 53 in abutting relation. If the thermostatic conditions cause normally closed switch 79 to open, or if it is desired to manually cause the motor to change speed, the run relay coil 69 is temporarily de-energized through the expedience of an open circuit in the run relay circuit or an open circuit in the entire motor circuit. In either instance, the de-energization of the run relay coil 69 permits the run relay armature 66 to travel upwardly in accordance with the biasing provided by the bias spring 64 and thus permits the flexible conductor blade 47 to contact the low speed running winding contact 46. When the circuit has been completed from the power terminal 8 through the flexible conductor blade 47 through the conductor 44, to the low speed running winding and subsequently to the common terminal 7, the motor will assume the second designated speed in accordance with the low speed running winding. If it is desired, the motor may be caused to resume the high speed by de-energizing the motor for a sufficient length of time to permit the centrifugal mechanism integral therewith to cause the flexible conductor blade 47 to once again contact terminal 18 thus inserting the high speed running winding in the motor circuit and disconnecting the low speed running winding. Switch 95 may be designed to interrupt the motor circuit for sufficient length of time to permit the rotor speed to be reduced to return the motor to the higher rotational velocity implemented through the utilization of the high speed running winding. Closing of the normally open contacts 96 and 97 completes an electrical circuit from the power terminal 8 through the switch 95 and conductor 94 to control terminal 93. From control terminal 93 the on-off relay coil 91 is energized through conductor 92. The energization of the coil 91 forces the on-off relay armature 87 to open contacts 52 and 53 thereby opening the circuit to the electric motor. The contacts 52 and 53 will be maintained in the open condition through the expediency of the energization of the on-off relay coil 91. The coil will remain energized as long as the normally opened contacts 96 and 97 are closed. If the switch arm 95 is of the thermostatic type, that is, a bi-metal, and the temperature conditions resume the predetermined level requiring motor actuation, the opening of contacts 96 and 97 will de-energize the on-off relay coil 91 and permit the contacts 52 and 53 to re-close through the expediency of the biasing spring 86. Closing of contacts 52 and 53 will once again complete an electrical circuit from the terminals 7 and 8 through the starting winding 27 and the high speed running winding 16. Once again the rotor will gain rotational velocity and after reaching the predetermined velocity at which the centrifugal mechanism operates, the switch arm 33 will be actuated to break the contact 36 thus de-energizing the starting winding and leaving the high speed running winding as the only winding in the circuit. The rotor will thus rotate at the speed determined by the high speed running winding which will remain actuated until the run relay coil 69 is de-energized through the interruption of the power circuit via switch 57 or through the interruption of the run relay circuit through the operation of the switch 79. Upon either of these occurrences the run relay coil 69 will become de-energized and the flexible conductor blade 47 will be permitted to follow the biasing of bias spring 64 and close into contact with the contact 46 thus energizing the low speed running winding 43 and de-energizing the high speed running winding 16. Therefore, the rotor will now slow to the speed determined by the low speed running winding and the motor will remain in that condition until the circuit is otherwise interrupted as described previously.

Referring to FIGURE 8, a modification of the circuit of FIG. 7 is shown wherein the run relay is operated independently of the open or closed condition of the line switch 57. Only those portions of the circuit of FIG. 7 that have been changed are included in FIG. 8, and like elements have like reference numerals with the addition of a prime to the corresponding numeral. Thus, the run relay coil 69' is connected between terminal 72' and is connected through conductor 73' to the terminal 8. The opposite side of the run relay coil 69' is connected through the remote switch 78', 79', back through the terminal 74' to the terminal 7. The run relay coil of FIG. 8 operates in accordance with the position of the remote switch 78', 79', and the motor may be started with the high speed winding 16' in the circuit as described in connection with FIG. 7; however, the ultimate operating speed of the motor depends entirely on the condition of energization of the run relay coil 69'. Thus, the motor controlled in accordance with the operation of the circuit of FIG. 8 will always start with the high winding in the circuit but will continue to run with either the high winding or the low speed winding in the circuit depending on the condition of the remote control switch 78', 79'. When the contacts of the remote switch are closed, the run relay coil 69' will be energized and the motor will run with the high speed winding connected into the circuit. If the normally closed remote contacts 78', 79' are opened, run relay coil 69' will remain de-energized regardless of the operating condition of the motor; therefore, the motor will start with the high speed winding 16' in the circuit and will subsequently shift to low speed with the low speed winding in the circuit when sufficient rotational velocity is attained to cause the flexible conductor blade 47' to break contact with the high speed winding and make contact with the low speed winding. The choice of the modification shown in FIG. 8 will depend on the usage to which the present invention is to be put; if speed control in accordance with a condition determined by a remote switch such as a thermostat is to be implemented without regard to the manual speed change, then the modification of FIG. 8 would be most appropriate.

Thus, the single-phase two-speed fractional horsepower motor speed control system of the present invention presents a system that is mounted completely within the motor housing itself, is compact, light, and requires little or no upkeep while providing an economically feasible unit that may be manufactured with the common two-speed fractional horsepower motor. A motor incorporating this system will include a female outlet mounted flush with the end bell for connection to remote controls only if remote automatic controls are deemed necessary. If remote automatic controls are not to be used, the terminals 72 and 74 of the female outlet are shorted together through the utilization of a simple male jack that may readily be plugged into the female outlet. The motor may then be used as a simple two-speed fractional horsepower motor whose speed may be changed merely by the temporary interruption of the power circuit which, in the forms which the present invention will most probably be utilized, will take the form of a simple wall switch. The system of the present invention is compatible with any wiring or control installation for prior art two-speed fractional horsepower single-phase motors and additionally provides, as part of the motor assembly, all necessary components for speed and operational control of the two-speed motor to give fully automatic and/or remote control of motor operation when the motor line attachment is only by the two wires of a single-phase power system.

It will be obvious to those skilled in the art that many modifications of the present invention may be made without departing from the spirit and scope thereof; for example, in some instances it may be appropriate to use a voltage-reducing transformer to reduce the voltage existing on all remote switches. The possibility of electrical hazard may thus be greatly reduced. Accordingly, the present invention is intended to be limited only by the scope of the claims appended hereto.

I claim:

1. A two-speed motor control system adapted to be readily converted to the automatic remote control of both the On-Off condition and the speed of a motor having starting, low speed, and high speed windings, said system comprising:
  (a) a first switch for selectively connecting said high speed winding or said low speed winding to a first power terminal;
  (b) a second switch for connecting said starting winding to said first power terminal;
  (c) a centrifugal means for opening, when actuated by the rotational velocity of said motor, said second switch and for urging said first switch to connect said low speed winding to said first power terminal;
  (d) a relay having a coil and an armature, said armature mechanically connected to said first switch for forcing, when said coil is energized, said first switch to connect said high speed winding to said first power terminal;
  (e) means connecting a second power terminal to said high speed, low speed, and starting winding;

(f) a third switch having normally closed contacts responsive to an external condition for opening said contacts;
(g) means connecting said relay coil and said third switch in series, said series circuit connected in parallel with said high speed winding.

2. A two-speed motor remotely while permitting control manually, said motor control for controlling a motor having starting, low speed, and high speed windings, comprising:
  (a) a first switch for selectively connecting said high speed winding or said low speed winding to a first power terminal;
  (b) a second switch for connecting said starting winding to said first power terminal;
  (c) a centrifugal means for opening, when actuated by the rotational velocity of said motor, said second switch and for urging said first switch to connect said low speed winding to said first power terminal;
  (d) a relay having a coil and an armature, said armature mechanically connected to said first switch for forcing, when said coil is energized, said first switch to connect said high speed winding to said first power terminal;
  (e) means connecting a second power terminal to said high speed, low speed, and starting windings through a normally closed series switch;
  (f) a third switch having normally closed contacts responsive to an external condition for opening said contacts;
  (g) means connecting said relay coil and third switch in series, said series circuit connected in parallel with said high speed winding;
  (h) a second relay having a coil and an armature, said armature connected to said normally closed series switch;
  (i) a fourth switch;
  (j) means connecting said first power terminal, the coil of said second relay, said fourth switch, and said second power terminal in series.

3. A control system for controlling a two-speed motor having starting, low speed, and high speed windings, said system comprising:
  (a) a first switch for selectively connecting said high speed winding or said low speed winding to a first power terminal;
  (b) a second switch for connecting said starting winding to said first power terminal;
  (c) a centrifugal means for opening, when actuated by the rotational velocity of said motor, said second switch and for urging said first switch to connect said low speed winding to said first power terminal;
  (d) a relay having a coil and an armature, said armature mechanically connected to said first switch for forcing, when said coil is energized, said first switch to connect said high speed winding to said first power terminal;
  (e) means connecting a second power terminal to said high speed, low speed, and starting windings through a normally closed series switch;
  (f) a third switch having normally closed contacts responsive to an external condition for opening said contacts;
  (g) means connecting said relay coil and third switch in series, said series circuit connected in parallel with said high speed winding;
  (h) a second relay having a coil and an armature, said armature connected to said normally closed series switch;
  (i) a fourth switch having normally open contacts responsive to an external condition for closing said contacts;
  (j) means connecting said first power terminal, the coil of said second relay, said fourth switch, and said second power terminal in series.

References Cited
UNITED STATES PATENTS

| | | | |
|---|---|---|---|
| 1,966,212 | 7/1934 | Morrill | 318—220.2 |
| 2,743,406 | 4/1956 | London | 318—221 X |
| 2,752,548 | 6/1956 | Seely | 318—221.1 |
| 2,774,024 | 12/1956 | Brammerlo | 318—221 X |
| 3,018,649 | 1/1962 | Barbulesco | 318—221 X |

ORIS L. RADER, *Primary Examiner.*

G. A. FRIEDBERG, G. Z. RUBINSON,
*Assistant Examiners.*